United States Patent
Amundson et al.

(10) Patent No.: US 8,448,113 B2
(45) Date of Patent: May 21, 2013

(54) EFFICIENTLY APPLYING A SINGLE TIMING ASSERTION TO MULTIPLE TIMING POINTS IN A CIRCUIT USING CREATING A DEFFINITION

(75) Inventors: Michael D. Amundson, Oronoco, MN (US); Craig M. Darsow, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 423 days.

(21) Appl. No.: 12/768,031

(22) Filed: Apr. 27, 2010

(65) Prior Publication Data
US 2011/0265052 A1    Oct. 27, 2011

(51) Int. Cl.
*G06F 17/50*    (2006.01)

(52) U.S. Cl.
USPC ............................ 716/113; 716/119; 716/126

(58) Field of Classification Search
USPC ......................................... 716/113, 119, 126
See application file for complete search history.

(56) References Cited

U.S. PATENT DOCUMENTS
6,601,112 B1 * 7/2003 O'Rourke et al. ............ 719/312

* cited by examiner

*Primary Examiner* — Thuan Do
(74) *Attorney, Agent, or Firm* — Jim Boice

(57) ABSTRACT

A computer implemented method, system and/or computer program product efficiently manage timing parameters in a circuit. Multiple instances of a definition are implemented onto a circuit. A set of related pins from the multiple instances are defined, and a common assertion value is asserted against all pins in the set of related pins.

20 Claims, 5 Drawing Sheets

EFFICIENTLY APPLYING A SINGLE TIMING ASSERTION TO MULTIPLE TIMING POINTS IN A CIRCUIT USING CREATING A DEFFINITION

BACKGROUND

The present disclosure relates to the field of electronics, and specifically to electronic circuits. Still more particularly, the present disclosure relates to the timing of electronic circuits.

BRIEF SUMMARY

A computer implemented method, system and/or computer program product efficiently manage timing parameters in a circuit. Multiple instances of a definition are implemented onto a circuit. A set of related pins from the multiple instances are defined, and a common assertion value is asserted against all pins in the set of related pins.

DETAILED DESCRIPTION

Figure 1:
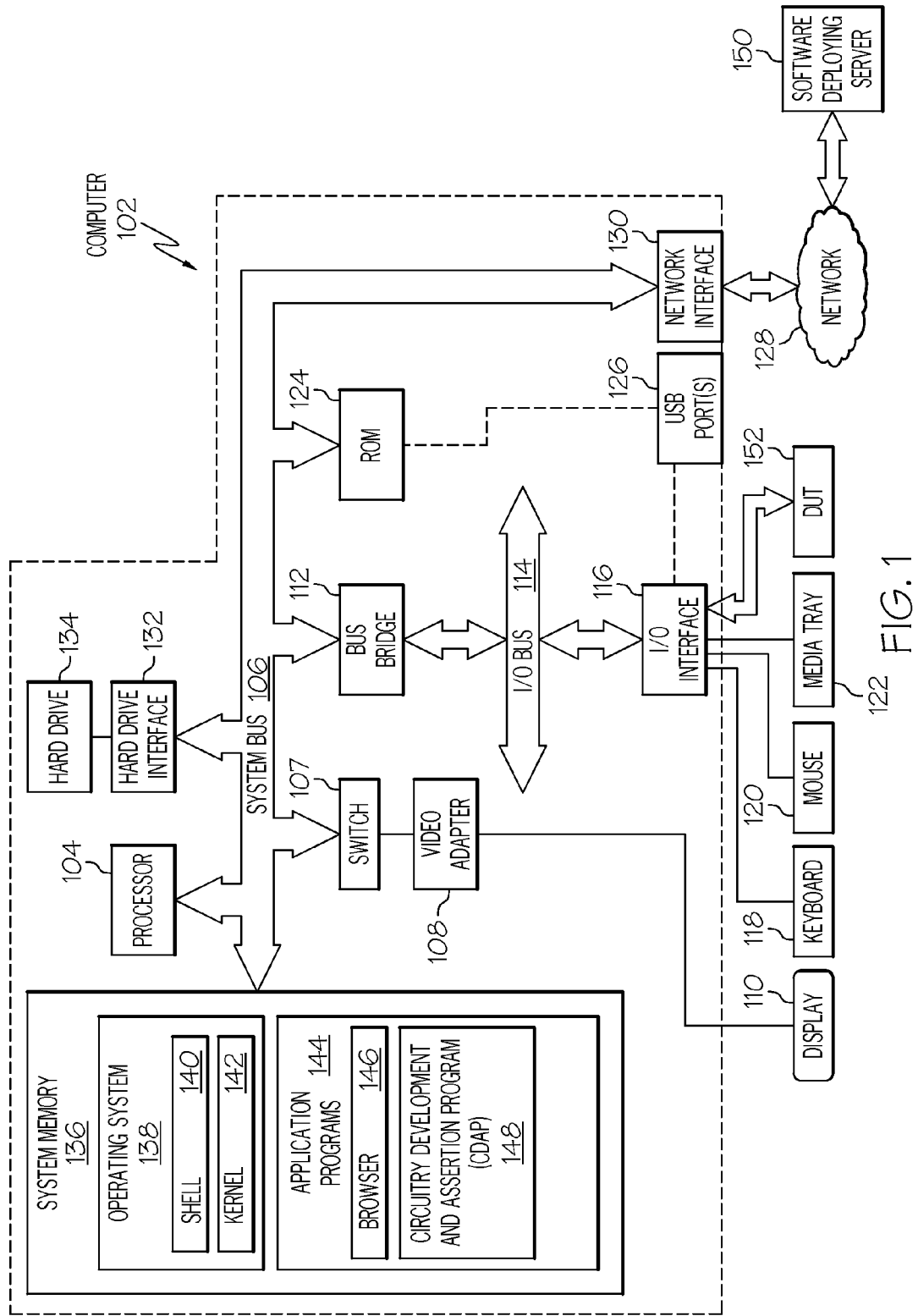
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may utilize the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., circuitry development and assertion program—CDAP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and a device under test (DUT) 152. While the format of the ports connected to I/O interface 116 may be any known to those skilled in the art of computer architecture, in a preferred embodiment some or all of these ports are universal serial bus (USB) ports, particularly when USB ports 126 are provided for additional I/O functionality. Also coupled to system bus 106 is a read only memory (ROM) 124, which is a static (and optionally programmable—PROM and/or erasable—EPROM) memory used to store boot programs and other static information.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a circuitry development and assertion program (CDAP) 148. CDAP 148 includes code for implementing the processes described below, including those described in FIGS. 2-5. In one embodiment, computer 102 is able to download CDAP 148 from software deploying server 150, including in an on-demand basis, wherein the code in CDAP 148 is not downloaded until needed for execution to define and/or implement the improved enterprise architecture described herein. Note further that, in one embodiment of the present invention, software deploying server 150 performs all of the functions associated with the present invention (including execution of CDAP 148), thus freeing computer 102 from having to use its own internal computing resources to execute CDAP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
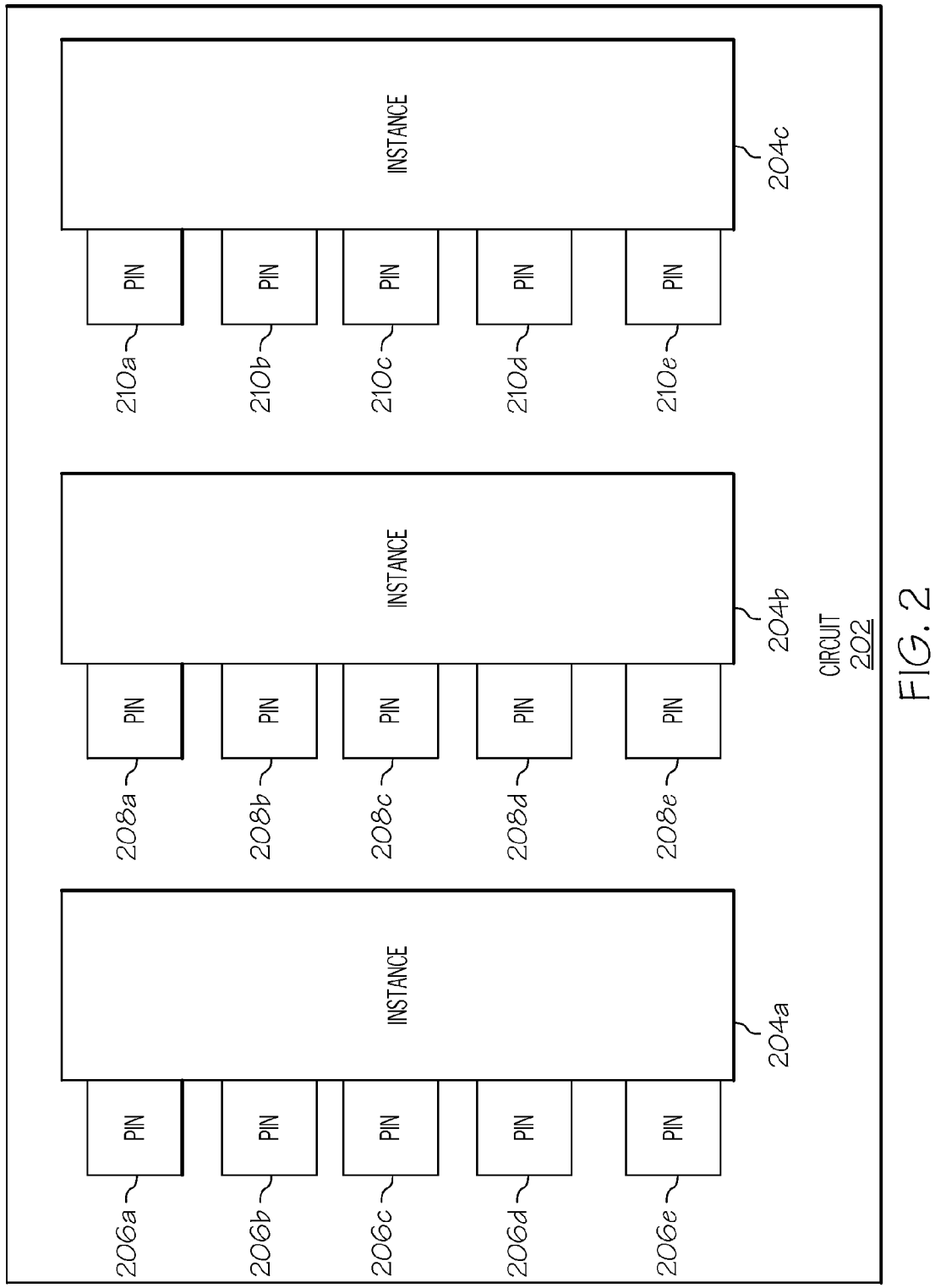
FIG. 2 illustrates a circuit having multiple instances for which a same assertion is applied against multiple external pins on the instances.

Referring now to FIG. 2, a circuit 202, which may be the device under test (DUT) 152 shown in FIG. 1, is depicted with multiple instances 204a-c (where "c" is an integer). For the sake of a simplified description, only three instances 204a-c are depicted. However, it is understood that in most embodiments of circuit 202 there will be hundreds, thousands or millions of instances 204, as well as hundreds, thousands or millions of instances of other definitions (DEFs) (not shown).

The depicted instances 204a-c are derived from a same DEF. That is, a single DEF (also known as a sub-circuit, core, abstract, macro, cell type) is used as a template to create multiple identical circuitry units, known as instances. Each DEF is of a particular function/type, such as that of a memory, adder, comparator, buffer, etc. While instances 204a-c may be physical hardware units, in one embodiment of the present disclosure instances 204a-c, as well as circuit 202, are software-generated simulations of physical hardware. As shown in FIG. 2, instance 204a comprises pins 206a-e, as well as other pins (not shown). Pins 206a-e are connection points to other circuitry within circuit 202, including to other pins such as pins 208a-e and pins 210a-e for respective instances 204b and 204c. As noted above, instances 204a-c are all derived from a same parent DEF. In one embodiment, therefore, pins 206a-e and pins 208a-e and pins 210a-e have the same operating parameters, including timing rules which define their timing behavior.

Figure 3:
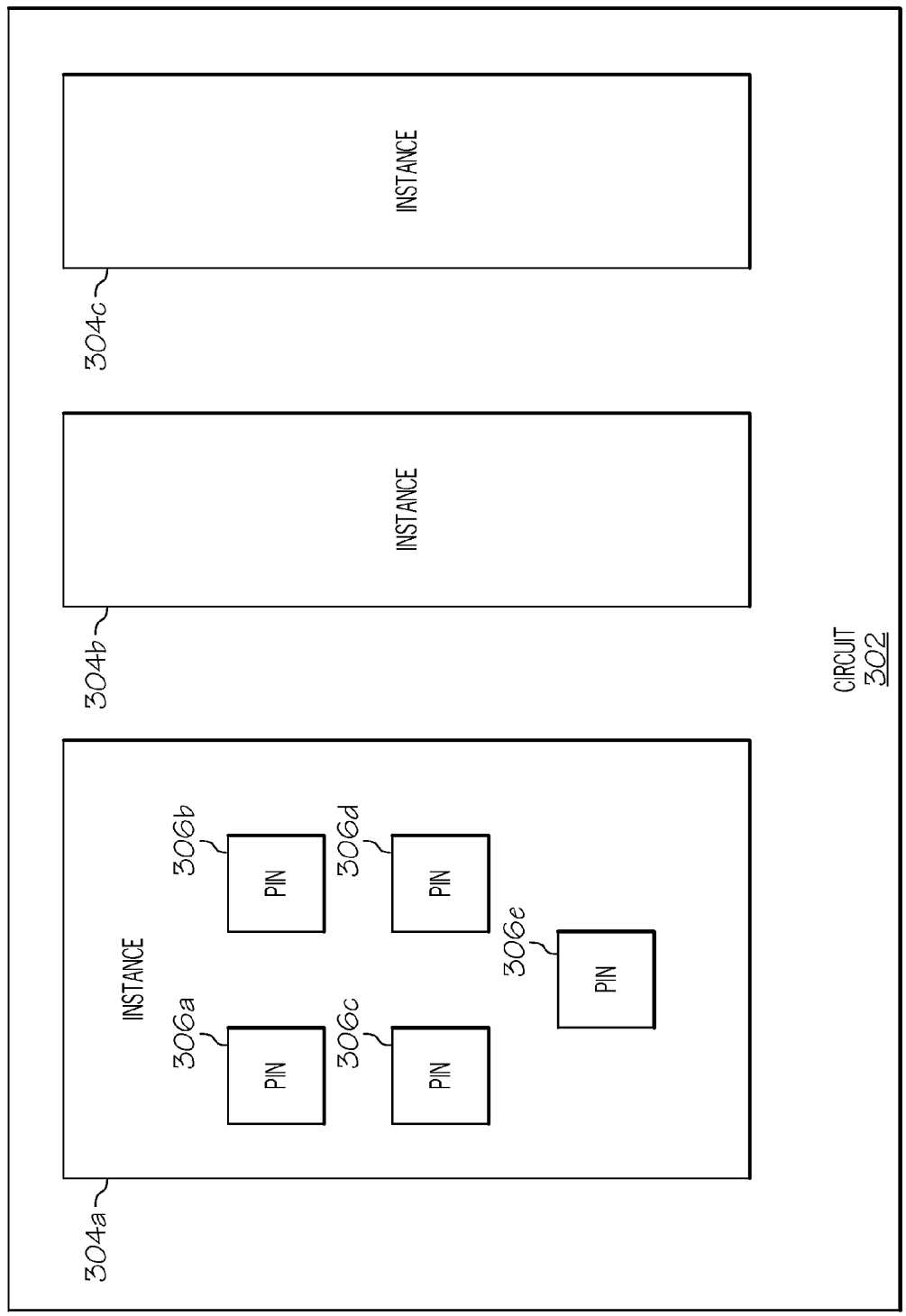
FIG. 3 depicts a circuit having instances in which a same assertion is applied against multiple internal pins within an instance.

Similarly, as shown in FIG. 3, a circuit 302 may have instances 304a-c, which are derived from a same DEF. The pins of interest, with regards to one embodiment of the present disclosure, are internal pins 306a-e (where "e" is an integer), which also have timing constraints applied against them.

In order to evaluate the timing of instances with circuit 202 or circuit 302, a static timing analysis (STA) may be performed. The STA uses software to compute expecting timing within a circuit, such as the expected number of time units required for an event from one location to reach another location within the circuit. For example, in FIG. 2 if pin 206a is connected to pin 208a, and pin 206a outputs a signal at time zero, then the STA may compute that pin 208a will receive that signal after 25 time units. Signals generated may be from a single pin, as just described, or they may be from a defined group of pins. The simplest signal would be a logical state transition from high to low or from low to high, while more complex signals are a series of logical state transitions.

STA utilizes a set of default rules to predict timing and signal patterns. These default rules, which are generally benign to the operation of the circuit, are generally known to be inaccurate in some special circumstances. Nonetheless, they provide a starting point for predicting timing patterns. Fine tuning of these predicted timing and signal patterns is achieved by applying assertions. An assertion is a user-defined constraint that adjusts the default timing pattern. Therefore, such assertions define a performance target for the circuit 202 as well as each instance 204. In some cases, a pin may require a one-off assertion, which is uniquely applied to that pin. However, there are other cases in which multiple pins have the same assertion applied to all of the multiple pins. In order to avoid the heavy overhead of looking up each pin by name, the present disclosure presents a process efficiently applying a timing assertion to a set of pins whose relationship to each one another is identified by their relationship to structures like DEFs (definitions) that are defined for the design. This application of assertions is accomplished in a very efficient manner so as to minimize STA runtime. To accomplish this, an additional application programming interface (API) is added to the STA.

Figure 4:
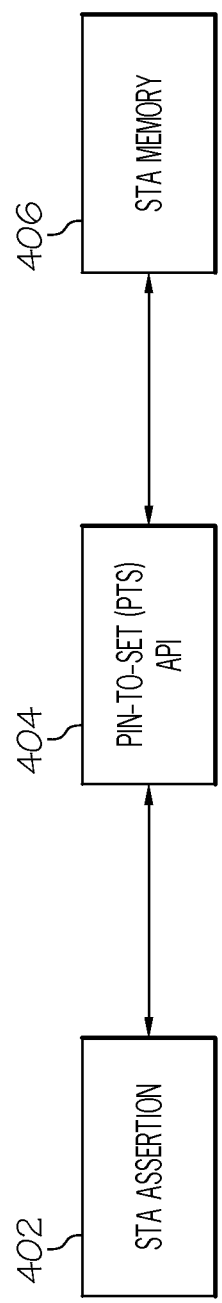
FIG. 4 illustrates a novel application program interface (API) used to apply a same assertion to all pins in a set of pins.

Referring now to FIG. 4, assume that an STA deploys an STA assertion 402 against a set of pins. For example, using the example shown in FIG. 2, circuit 202 has the instances 204a-c (which can be identified as MEMORY), each of which has five pins. Without the presently disclosed API, retrieving the assertions would be performed using pseudocode such as:

```
foreach inst $instances_of_MEMORY
    {some_command -pins {a b c d e}
        -some_argument }
```

In this case the some_command with name lookup is executed num_instances*num/pins in each instance=N times. Such STA system name lookups are expensive with respect to runtime. As the number of instances increases, the runtime continues to degrade. Furthermore, the some_argument could represent an action that itself requires accessing of data about pins or complex runtime-intensive computations. Other implementations in state of the art STA systems can group common pins in real-time. For example, the pseudocode may be modified to appear as:

```
set pgroup [create_pin_group -gates $instances_of_MEMORY -pins
{a b c d e}]
some_command -pin_group $pg -some_argument
```

This method reduces overall STA runtime since the system only has to look-up names one time. However, this approach still has the limitation of looking up each pin by name. Even in compiled software code this name look-up can be expensive. One embodiment of the present disclosure overcomes this limitation.

As depicted in FIG. 4, rather than looking up every name for each of the pins in a sequential and time-expensive manner, a novel pin-to-set (PTS) application program interface (API) 404 receives the STA assertion 402. By using logic such as a lookup table, offsets to entries in an STA memory 406, etc., the PTS API 404 is able to determine that the STA assertion 402 needs to be applied to all related pins located in the STA memory 406. Therefore, the PTS API 404 returns instructions to the STA instructing the STA to apply the same assertion to all pins in the set of common pins. Thus, the following pseudocode can accomplish such assertion retrieval/deployment by defining a pin group ("set pg") before the STA memory is completely allocated:

```
# STA memory not yet allocated
    set pg1 [create_pin_group -gates $instances_of_MEMORY -pins
    {a b c d e}]
    set pg2 [create_pin_group -definition $specific_MEMORY_B
    -pins {x y z}]
    initialize_STA
    # STA memory allocated
    some_command -pin_group $pg1 -some_argument
    some_command -pin_group $pg2 -some_argument
```

The pin groups are created before the STA memory is complete allocated. This allows efficient memory structures to be built during STA initialization. This may include, but is not limited to, lookup tables, offsets, etc. This method does not require any real-time name lookups since the STA memory is allocated in a novel fashion. In some implementations name lookups may still be necessary, but since this is performed during the STA initialization, the lookup is processed in the most efficient manner. Therefore overall runtime improves beyond known state of the art methods.

Alternatively, rather than making the groups during an efficient pre-initialization phase of timing, the STA engine can systematically create memory structures as it loads multiple copies of related structures that include rapid-access connections between equivalent points in each copy of the related structures. Thus, even after STA initialization is complete, an assertion that references one or several pins on all or a subset of copies of the related structures need perform name-lookup and other-argument computations only once— for the first assertion—and can then have the repeated assertions applied using the fast internal location method.

In one embodiment, if the pin group contains all pins in the instances in the set, the run-time is improved further, since no name lookup is required. That is if all pins are asserted in the same manner, then there is no need to look up any pin definitions, since the following pseudocode will accomplish this universal assertion:

```
set pg [create_pin_group -definition $specific_MEMORY_B -all_pins]
    initialize_STA
        some_command -pin_group $pg -some_argument
```

Figure 5:
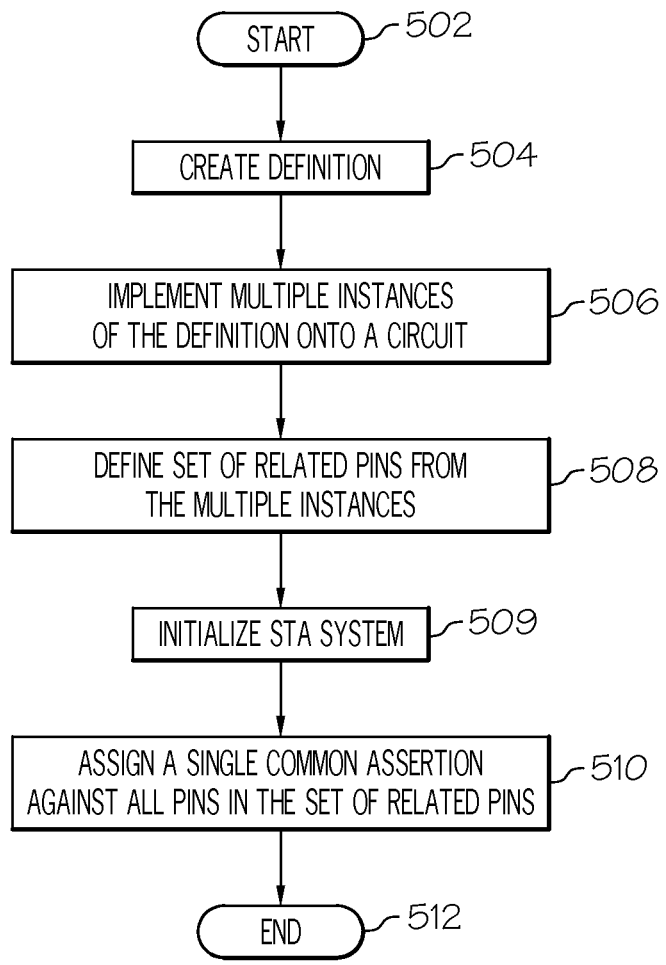
FIG. 5 is a high-level flow chart of exemplary steps taken to develop timing parameters within a circuit by applying a same assertion against related pins.

With reference now to FIG. 5, a high-level flow chart of exemplary steps taken to manage timing parameters within a circuit by applying a same assertion against related pins is presented. After initiator block 502, a definition is created (block 504). This definition describes a hardware design of a component of a circuit, such as an integrated circuit, which may be implemented either in hardware or a software simulation. As described in block 506, multiple instances of the definition are implemented onto the circuit. A set of related pins from the multiple instances are then defined, as described in block 508. As described above, the related pins share a common performance parameter, such as a timing requirement for sending/receiving a signal, transmitting or responding to an event signal, etc., and/or share a same parent DEF. These related pins may be internal pins from a single definition (which is exploited to generate multiple instances), a same pin from multiple instances, or a group of pins from multiple instances of a definition. As depicted in block 509, the STA system is initialized by using any pre-defined groupings defined in the process depicted in block 508. As described in block 510, a common assertion value is asserted against all pins in the set of related pins. This common assertion value defines a single constraint used to adjust a default constraint on the related pins. The process ends at terminator block 512.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a Hardware Description Language (HDL) such as VHDL (VHSIC Hardware Description Language) or Verilog. HDL's are an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of efficiently managing timing parameters in a circuit, the computer implemented method comprising:
   creating a definition, wherein the definition describes a hardware design of a component of a circuit;
   implementing, by a processor, multiple instances of the definition onto the circuit;
   defining a set of related pins from the multiple instances, wherein the related pins share a common requisite performance parameter; and
   asserting, by the processor, a single common assertion against all pins in the set of related pins, wherein the single common assertion adjusts a constraint against all pins in the set of related pins.

2. The computer implemented method of claim 1, further comprising:
   initializing, by the processor, a static timing analysis (STA) using pre-defined groupings of related pins.

3. The computer implemented method of claim 1, wherein the circuit is an integrated circuit.

4. The computer implemented method of claim 1, wherein the constraint is a requisite time at which an input signal arrives at each of the related pins.

5. The computer implemented method of claim 1, wherein the constraint is a requisite time at which an output signal leaves each of the related pins.

6. The computer implemented method of claim 1, wherein the single common assertion adjusts a default timing that has been set for the pins in the set of related pins.

7. The computer implemented method of claim 1, wherein the set of related pins are internal pins from instances created from a single definition.

8. The computer implemented method of claim 1, wherein the set of related pins are equivalent pins from multiple instances of the definition.

9. The computer implemented method of claim 1, wherein the set of related pins are a predetermined group of pins from multiple instances of the definition.

10. A computer program product for managing timing parameters in a circuit, the computer program product comprising:
a computer readable storage medium;
first program instructions to create a definition, wherein the definition describes a hardware design of a component of a circuit;
second program instructions to implement multiple instances of the definition onto the circuit;
third program instructions to define a set of related pins from the multiple instances, wherein the related pins share a common requisite performance parameter; and
fourth program instructions to assert a single common assertion against all pins in the set of related pins, wherein the single common assertion adjusts a constraint against all pins in the set of related pins; and wherein
the first, second, third and fourth program instructions are stored on the computer readable storage medium.

11. The computer program product of claim 10, further comprising:
fifth program instructions to initialize a static timing analysis (STA) by using pre-defined groupings of related pins; and wherein
the fifth program instructions are stored on the computer readable storage medium.

12. The computer program product of claim 10, wherein the constraint is a requisite time at which an input signal arrives at each of the related pins.

13. The computer program product of claim 10, wherein the constraint is a requisite time at which an output signal leaves each of the related pins.

14. A computer system comprising:
a central processing unit (CPU), a computer readable memory, and a computer readable storage medium;
first program instructions to create a definition, wherein the definition describes a hardware design of a component of a circuit;
second program instructions to implement multiple instances of the definition onto the circuit;
third program instructions to define a set of related pins from the multiple instances, wherein the related pins share a common requisite performance parameter; and
fourth program instructions to assert a single common assertion against all pins in the set of related pins, wherein the single common assertion adjusts a constraint against all pins in the set of related pins; and wherein
the first, second, third and fourth program instructions are stored on the computer readable storage medium for execution by the CPU via the computer readable memory.

15. The computer system of claim 14, wherein the circuit is an integrated circuit.

16. The computer system of claim 14, wherein the constraint is a requisite time at which an input signal arrives at each of the related pins.

17. The computer system of claim 14, wherein the constraint is a requisite time at which an output signal leaves each of the related pins.

18. The computer system of claim 14, wherein the single common assertion adjusts a default timing that has been set for the pins in the set of related pins.

19. The computer system of claim 14, wherein the set of related pins are internal pins from a single instance derived from the definition.

20. The computer system of claim 14, wherein the set of related pins are a predetermined group of pins from multiple instances of the definition.

* * * * *